(12) United States Patent
Hu et al.

(10) Patent No.: US 11,233,825 B2
(45) Date of Patent: Jan. 25, 2022

(54) SERVER INITIAL CONFIGURATION VIA OUT-OF-BAND CHANNEL

(71) Applicant: Dell Products L.P., Round Rock, TX (US)

(72) Inventors: Lixia Hu, Shanghai (CN); Zhuo Zhang, Shanghai (CN); Niannian Xia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/916,653

(22) Filed: Jun. 30, 2020

(65) Prior Publication Data

US 2021/0392166 A1 Dec. 16, 2021

(30) Foreign Application Priority Data

Jun. 12, 2020 (CN) .......................... 202010537341.8

(51) Int. Cl.
| | | |
|---|---|---|
| *H04L 29/06* | (2006.01) | |
| *G06F 9/54* | (2006.01) | |
| *G06F 9/445* | (2018.01) | |
| *G06F 13/42* | (2006.01) | |

(52) U.S. Cl.
CPC .......... *H04L 63/18* (2013.01); *G06F 9/44505* (2013.01); *G06F 9/541* (2013.01); *G06F 13/4282* (2013.01); *H04L 29/06047* (2013.01); *H04L 63/10* (2013.01); *G06F 2213/0042* (2013.01)

(58) Field of Classification Search
CPC ... H04L 63/18; H04L 29/06047; H04L 63/10; G06F 9/541; G06F 9/44505; G06F 13/4282; G06F 2213/0042
See application file for complete search history.

(56) References Cited

U.S. PATENT DOCUMENTS

| 10,824,437 | B1* | 11/2020 | Righi | H04L 41/082 |
|---|---|---|---|---|
| 2009/0019281 | A1* | 1/2009 | Winslow | H04L 61/2015 713/162 |
| 2017/0116002 | A1* | 4/2017 | Kaushik | G06F 9/4451 |
| 2018/0150306 | A1* | 5/2018 | Govindaraju | G06F 9/4406 |
| 2019/0004826 | A1* | 1/2019 | Ryan | G06F 9/44505 |
| 2019/0050351 | A1* | 2/2019 | Sahu | G06F 3/0673 |
| 2020/0133686 | A1* | 4/2020 | Lakshminarasimha | G06F 8/60 |
| 2020/0210203 | A1* | 7/2020 | Madala | G06F 9/4406 |
| 2020/0356656 | A1* | 11/2020 | Chhabra | G06F 21/44 |

OTHER PUBLICATIONS

Supermicro® Redfish® Reference Guide, Revision 2.0c; Super Micro Computer, Inc.; Jun. 3, 2020. (Year: 2020).*

* cited by examiner

*Primary Examiner* — Glenn A. Auve

(74) *Attorney, Agent, or Firm* — Jackson Walker L.L.P.

(57) ABSTRACT

An information handling system may include a host system having an initial operating system image deployed thereon; and a management controller configured to provide out-of-band management of the information handling system. The management controller may be further configured to: receive, via a secure management network, a request to configure a plurality of operating system settings; transmit, to an initial agent executing on the operating system, one or more instructions to configure the plurality of operating system settings in accordance with the request; and after the configuration of the plurality of operating system settings, allow a user to log in to the operating system via a non-secure data network.

20 Claims, 2 Drawing Sheets

SERVER INITIAL CONFIGURATION VIA OUT-OF-BAND CHANNEL

TECHNICAL FIELD

The present disclosure relates in general to information handling systems, and more particularly to the initial configuration of information handling systems such as server information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many technologies exist for deploying and provisioning server systems automatically, such as PXE, disk cloning, etc. Usually, a base operating system (OS) image with a default configuration state is installed at the beginning on a host. Many times, server systems in an IT infrastructure solution (e.g., hyper-converged infrastructure (HCI) appliances, database appliances, etc.) will be delivered with a pre-installed OS.

However, the default configuration state in such a base or pre-installed OS is mostly public and fixed. For example, the default username, the default password, the default network settings, etc. may be in use to allow an upper-layer management system to take over the host to do initial configuration with this information. However, this leads to the system being in an unprotected state for a certain period of time. It is also difficult to change the default networking settings if the field network environment is very limited (e.g., if the pre-installed OS expects a DHCP server, but none is present). Otherwise, a user may have to operate server systems one by one via remote or physical console to make manual configuration changes.

Accordingly, embodiments of this disclosure provide an automated approach to configure an isolated and protected OS image via an out-of-band management channel. With this approach, credentials and sensitive information need not be exposed to an externally accessible data network. Furthermore, running initial configuration need not depend on a predefined network setup.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the configuration of server information handling systems may be reduced or eliminated.

In accordance with embodiments of the present disclosure, an information handling system may include a host system having an initial operating system image deployed thereon; and a management controller configured to provide out-of-band management of the information handling system. The management controller may be further configured to: receive, via a secure management network, a request to configure a plurality of operating system settings; transmit, to an initial agent executing on the operating system, one or more instructions to configure the plurality of operating system settings in accordance with the request; and after the configuration of the plurality of operating system settings, allow a user to log in to the operating system via a non-secure data network.

In accordance with these and other embodiments of the present disclosure, a method may include a management controller configured to provide out-of-band management of an information handling system receiving, via a secure management network, a request to configure a plurality of operating system settings of an initial operating system image deployed on a host system of the information handling system; the management controller transmitting, to an initial agent executing on the operating system, one or more instructions to configure the plurality of operating system settings in accordance with the request; and after the configuration of the plurality of operating system settings, the management controller allowing a user to log in to the operating system via a non-secure data network.

In accordance with these and other embodiments of the present disclosure, an article of manufacture may include a non-transitory, computer-readable medium having computer-executable code thereon that is executable by a management controller of an information handling system for: receiving, via a secure management network, a request to configure a plurality of operating system settings of an initial operating system image deployed on a host system of the information handling system; transmitting, to an initial agent executing on the operating system, one or more instructions to configure the plurality of operating system settings in accordance with the request; and after the configuration of the plurality of operating system settings, allowing a user to log in to the operating system via a non-secure data network.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
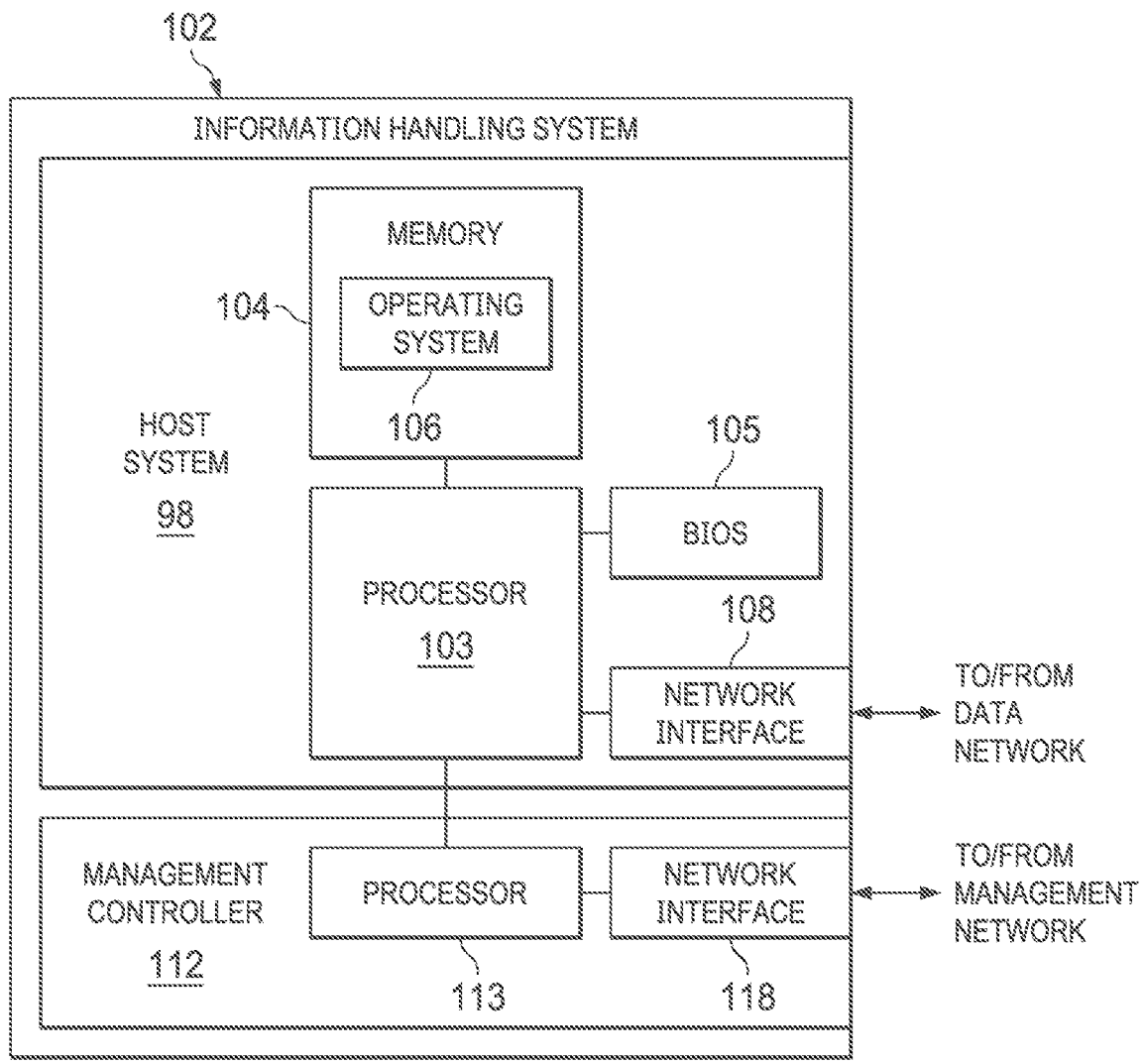
FIG. 1 illustrates a block diagram of an example information handling system, in accordance with embodiments of the present disclosure.
Figure 2A:
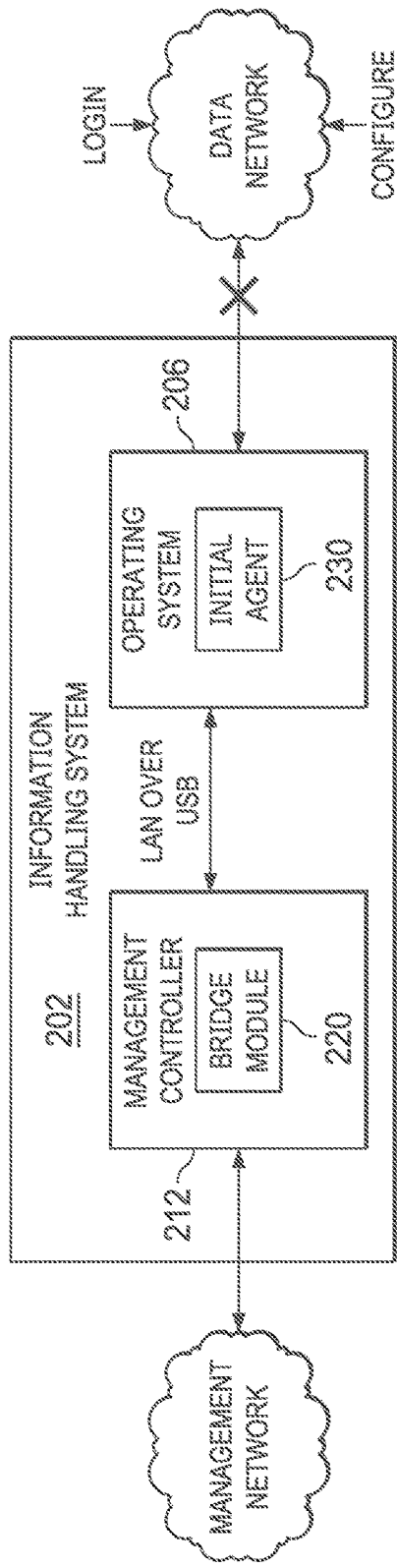
FIGS. 2A and 2B illustrate block diagrams of another example information handling system, in accordance with embodiments of the present disclosure.
Figure 2B:
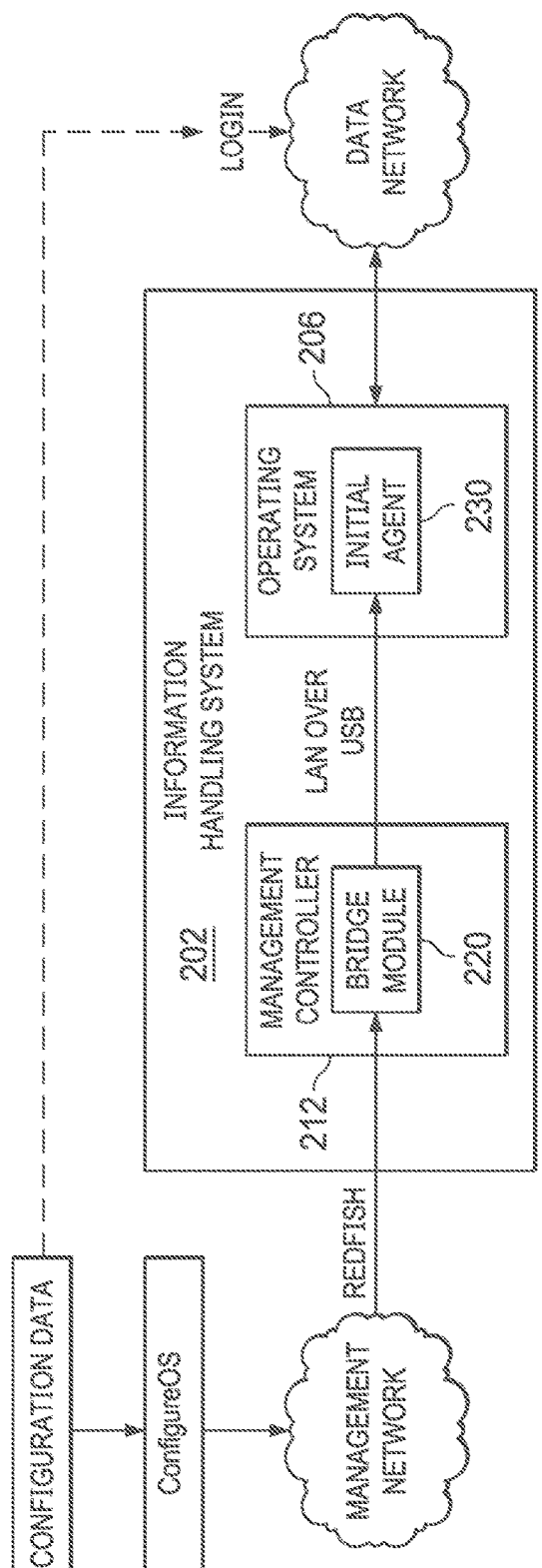

Preferred embodiments and their advantages are best understood by reference to FIGS. 1 through 2B, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may allow for configuration of an information handling system such as information handling system 102 via an out-of-band channel such as the management network coupled to network interface 118 of management controller 112, which may be a BMC in some embodiments.

In particular, a new Redfish® application programming interface (API) referred to herein as "ConfigureOS" may be implemented on management controller 112. Such an API may be accessible, for example, via an address such as https://x.x.x.x/redfish/v1/Systems/System.Embedded.1/ConfigureOS. Table 1 below shows some details for the usage of this API.

It is to be noted that various elements discussed herein are related to features of the Redfish® Specification 1.9.1, released Apr. 15, 2020 (hereinafter, Redfish® Specification), which is incorporated by reference in its entirety. One of ordinary skill in the art with the benefit of this disclosure will understand its applicability to other specifications (e.g., prior or successor versions of the Redfish® Specification). Further, some embodiments may be implemented via different technologies other than Redfish®.

TABLE 1

| ConfigureOS | |
|---|---|
| Description | The ConfigureOS( ) method may be used to configure the installed OS. |
| URL | /redfish/v1/Systems/System.Embedded.1/ConfigureOS |
| Supported HTTP Method | POST |
| Privileges | Login |
| Supported Parameters | Username Password Address Netmask Gateway . . . |
| HTTP status code | 200 Success 400 PropertyValueTypeError 403 InsufficientPrivilege 500 InternalError 501 Can't connect to initial Agent in OS 502 Invalid data 503 Fail to initialize OS |
| HTTP reply data | Address (e.g., for use when setting network as DHCP) |

Turning now to FIGS. 2A and 2B, block diagrams of an information handling system 202 are shown. Information handling system 202 may be similar in some respects to information handling system 102 from FIG. 1.

As shown in FIG. 2A, information handling system 202 may be pre-deployed with a standard OS image. Bridge module 220 may be implemented in management controller 212, and may be configured to POST all of the data from the "ConfigureOS" API to operating system 206. For example, a LAN-over-USB connection may be implemented between management controller 212 and OS 206.

At this initial stage, the OS may be inaccessible via the insecure data network. As discussed in more detail below, however, connections via the secure management network may be allowed.

When a manufacturer deploys the pre-installed OS, an initial agent 230 may be included as a component of the OS. Initial agent 230 may run as an HTTPS REST API service bound to the LAN-over-USB NIC on a certain port. In particular embodiments, initial agent 230 may be communicatively coupled to management controller 212 via a management controller software agent (a BMC software agent, etc.).

The supported URL for accessing initial agent 230 may be established as https://x.x.x.x/api/v1/os/configure or any other desired URL. No authentication may be needed when sending commands to initial agent 230. When initial agent 230 receives a POST request, it may parse the input configuration data and initialize the system as required, creating new account(s), configuring the network, etc. Username, Password, Address, Netmask, Gateway, and any other desired elements may be part of the supported configuration.

FIG. 2B illustrates further detail regarding the initial configuration of the pre-installed OS. When the customer receives the system with a pre-installed OS, the management port of the management controller (e.g., BMC) may be connected to the secure management network, and data ports may be connected to the data network. The system may then be powered on.

After the OS boots, the management controller software agent may configure LAN-over-USB to establish a path between the management controller and the OS. Initial agent 230 may then begin to listen on a selected port, and it may be bound to LAN-over-USB.

Up until this point in the process, logging in to the OS (e.g., via the data network) and sending configuration commands to initial agent 230 may not be allowed. The customer may then call the Redfish® command "ConfigureOS" described above, e.g., by using a login account of the management controller. The customer may then input any desired OS configuration data. In these and other embodiments, such information may be passed to the ConfigureOS command in a scripted manner in order to expedite configuration a multiple systems.

Bridge module 220 may then POST all of the configuration data to the REST API of initial agent 230 via LAN-over-USB. Once initial agent 230 receives the initial configuration, the OS may be initialized based on the input configuration. After successfully initializing the OS, a new network address for information handling system 202 may also be returned to bridge module 220 as the Redfish® reply data in some embodiments.

After this process is complete, initial agent 230 may terminate itself, and the customer may log in to the system (e.g., via the data network), for example with account credentials that have been configured via the ConfigureOS procedure.

Thus embodiments of this disclosure may provide many benefits. The pre-installed OS may become more secure, avoiding risk of pre-defined authentication credentials. Fixed network configuration in the pre-installed OS may also be eliminated, along with the usual dependence on DHCP. The initial configuration process for the server may become more flexible and fully automated.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a host system having an initial operating system image deployed thereon; and
    a management controller configured to provide out-of-band management of the information handling system, and further configured to:
    receive, via a secure management network, a request to configure a plurality of operating system settings;
    transmit, to an initial agent executing on an operating system of the initial operating system image, one or more instructions to configure the plurality of operating system settings in accordance with the request; and
    after the configuration of the plurality of operating system settings, allow a user to log in to the operating system via a non-secure data network.

2. The information handling system of claim 1, wherein the request is received via an application programming interface (API) that conforms to a Redfish® Specification.

3. The information handling system of claim 1, wherein the initial operating system image is pre-installed by a manufacturer of the information handling system.

4. The information handling system of claim 1, wherein the management controller is communicatively coupled to the initial agent via a local area network (LAN) over Universal Serial Bus (USB) connection.

5. The information handling system of claim 4, wherein the management controller is configured to communicate with the initial agent via a POST request.

6. The information handling system of claim 1, wherein the initial agent is a component of the initial operating system image.

7. The information handling system of claim 1, wherein prior to the configuration of the plurality of operating system settings, the information handling system is configured not to allow the user to log in to the operating system via a non-secure data network.

8. The information handling system of claim 1, wherein the plurality of operating system settings includes at least one setting selected from the group consisting of a username, a password, a network address, a netmask, and a network gateway.

9. A method comprising:
    a management controller configured to provide out-of-band management of an information handling system receiving, via a secure management network, a request to configure a plurality of operating system settings of an initial operating system image deployed on a host system of the information handling system;
    the management controller transmitting, to an initial agent executing on an operating system of the initial operating system image, one or more instructions to configure the plurality of operating system settings in accordance with the request; and after the configuration of the plurality of operating system settings, the management controller allowing a user to log in to the operating system via a non-secure data network.

10. The method of claim 9, wherein the management controller is a baseboard management controller (BMC).

11. The method of claim 9, wherein the request is received via an application programming interface (API) that conforms to a Redfish® Specification.

12. The method of claim 9, wherein the plurality of operating system settings includes at least one setting selected from the group consisting of a username, a password, a network address, a netmask, and a network gateway.

13. An article of manufacture comprising a non-transitory, computer-readable medium having computer-executable code thereon that is executable by a management controller of an information handling system for:
receiving, via a secure management network, a request to configure a plurality of operating system settings of an initial operating system image deployed on a host system of the information handling system;
transmitting, to an initial agent executing on an operating system of the initial operating system image, one or more instructions to configure the plurality of operating system settings in accordance with the request; and
after the configuration of the plurality of operating system settings, allowing a user to log in to the operating system via a non-secure data network.

14. The article of claim 13, wherein the request is received via an application programming interface (API) that conforms to a Redfish® Specification.

15. The article of claim 14, wherein the management controller is further configured to receive a response from the initial agent, the response comprising a new network address for the information handling system.

16. The article of claim 13, wherein the management controller is communicatively coupled to the initial agent via a local area network (LAN) over Universal Serial Bus (USB) connection.

17. The article of claim 16, wherein the management controller is configured to communicate with the initial agent via a POST request.

18. The article of claim 13, wherein the initial agent is a component of the initial operating system image.

19. The article of claim 13, wherein prior to the configuration of the plurality of operating system settings, the information handling system is configured not to allow the user to log in to the operating system via a non-secure data network.

20. The article of claim 13, wherein the plurality of operating system settings includes at least one setting selected from the group consisting of a username, a password, a network address, a netmask, and a network gateway.

* * * * *